(12) United States Patent
Park et al.

(10) Patent No.: US 10,163,258 B2
(45) Date of Patent: Dec. 25, 2018

(54) TESSELLATION APPARATUS AND METHOD

(71) Applicant: Samsung Electronics Co., Ltd., Suwon-si (KR)

(72) Inventors: Jeongsoo Park, Suwon-si (KR); Kwontaek Kwon, Suwon-si (KR); Wonjong Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 224 days.

(21) Appl. No.: 14/795,083

(22) Filed: Jul. 9, 2015

(65) Prior Publication Data

US 2016/0196690 A1 Jul. 7, 2016

(30) Foreign Application Priority Data

Jan. 6, 2015 (KR) .......................... 10-2015-0001176

(51) Int. Cl.
*G06T 17/20* (2006.01)

(52) U.S. Cl.
CPC .................................... *G06T 17/20* (2013.01)

(58) Field of Classification Search
None
See application file for complete search history.

(56) References Cited

U.S. PATENT DOCUMENTS

| 5,317,526 A | * | 5/1994 | Urano | G06F 7/483 708/204 |
| 5,481,686 A | * | 1/1996 | Dockser | G06F 7/483 712/222 |
| 8,558,833 B1 | | 10/2013 | Moreton | |
| 8,698,803 B2 | | 4/2014 | Patel et al. | |
| 2009/0150654 A1 | | 6/2009 | Oberman et al. | |
| 2011/0004644 A1 | | 1/2011 | Henry et al. | |
| 2013/0169634 A1 | * | 7/2013 | Goel | G06T 15/005 345/423 |

FOREIGN PATENT DOCUMENTS

| KR | 10-0887327 | 3/2009 |
| KR | 10-2013-0056808 | 5/2013 |

* cited by examiner

*Primary Examiner* — Kyle Zhai
(74) *Attorney, Agent, or Firm* — Harness, Dickey & Pierce, P.L.C.

(57) ABSTRACT

A tessellation method and apparatus are provided, where the tessellation method includes receiving a first value that is calculated in performing tessellation, the first value being a first floating-point real number represented by a first exponent and a first mantissa; determining a second precision of the first mantissa on the basis of a value of the first exponent and a first precision; and adjusting the first mantissa to have the second precision.

16 Claims, 7 Drawing Sheets

TESSELLATION APPARATUS AND METHOD

CROSS-REFERENCE TO RELATED APPLICATION(S)

This application claims the benefit under 35 USC § 119(a) of Korean Patent Application No. 10-2015-0001176, filed on Jan. 6, 2015, in the Korean Intellectual Property Office, the disclosure of which is incorporated herein by reference for all purposes.

BACKGROUND

1. Field

The following description relates to tessellation apparatuses and methods for performing tessellation by adjusting a precision of a floating point.

2. Description of Related Art

There are two methods of representing decimals in computer systems. There are a fixed-point method that fixes a decimal point at a constant position in an array of numbers and a floating-point method that represents numbers using an exponent part and a mantissa part. In the floating-point method, the position of a decimal point varies according to the size of an exponent part. The floating-point method may represent a larger range of numbers than the fixed-point method. Therefore, in graphics processing, the floating-point method is mainly used for accurate modeling and calculation.

Tessellation is a process in three-dimensional (3D) graphics processing and refers to a process of dividing a polygon into a plurality of sub-polygons. In the tessellation process, each boundary of an input polygon may be divided by certain rules according to tessellation factors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are methods and apparatuses for performing tessellation so that a crack does not occur at a shared boundary between adjacent patches.

In one general aspect, there is provided a tessellation method including receiving a first value that is calculated in performing tessellation, the first value being a first floating-point real number represented by a first exponent and a first mantissa, determining a second precision of the first mantissa based on a value of the first exponent and a first precision, and adjusting the first mantissa to have the second precision.

The adjusting of the first mantissa may include rounding off a number of a decimal place such that the first mantissa has the second precision.

The method may include receiving a tessellation factor, and the first precision being determined on the basis of the tessellation factor.

A value of the first precision may be determined as the first value in response to a value of the tessellation factor being greater than or equal to a preset value, and the value of the first precision may be determined as a second value smaller than the first value in response to the value of the tessellation factor being smaller than the preset value.

The tessellation method may include receiving a tessellation parameter as a second floating-point real number represented by a second exponent and a second mantissa, determining a fourth precision of the second mantissa on the basis of a value of the second exponent and a third precision, and adjusting the second mantissa such to have the fourth precision, wherein the first value may include a value calculated on the basis of a second floating-point real number having the adjusted second mantissa.

The tessellation method may include calculating barycentric coordinates on the basis of the second floating-point real number having the adjusted second mantissa, and wherein the first value may include the barycentric coordinates.

The tessellation method may include generating a vertex by calculating a patch equation using the barycentric coordinates, and wherein the first value may include a value of the generated vertex.

The first precision may be predetermined.

The first precision may increase as the value thereof increases.

In another general aspect, there is provided a tessellation apparatus including a receiver configured to receive a first value that is calculated in performing tessellation, the first value being a first floating-point real number represented by a first exponent and a first mantissa, a precision controller configured to determine a second precision of the first mantissa on the basis of a value of the first exponent and a first precision, and a mantissa adjuster configured to adjust the first mantissa such to have the second precision.

The mantissa adjuster may be further configured to round off a number of a decimal place such that the first mantissa has the second precision.

The precision controller may be further configured to determine the first precision on the basis of a tessellation factor.

The precision controller may be further configured to determine a value of the first precision as the first value, in response to a value of the tessellation factor being greater than or equal to a preset value, and determine the value of the first precision as a second value smaller than the first value, in response to the value of the tessellation factor being smaller than the preset value.

The receiver may be further configured to receive a tessellation parameter as a second floating-point real number represented by a second exponent and a second mantissa, the precision controller may be further configured to determine a fourth precision of the second mantissa on the basis of a value of the second exponent and a third precision, the mantissa adjuster may be further configured to adjust the second mantissa to have the fourth precision, and the first value may include a value calculated on the basis of a second floating-point real number having the adjusted second mantissa.

The tessellation apparatus may include a calculator configured to calculate barycentric coordinates on the basis of the second floating-point real number having the adjusted second mantissa, and wherein the first value comprises the barycentric coordinates.

The calculator may be further configured to generate a vertex by calculating a patch equation using the barycentric coordinates, and the first value may include a value of the generated vertex.

The first precision may be predetermined.

In another general aspect, there is provided a tessellation method including receiving a floating-point real number comprising a exponent and a mantissa, determining a second precision of the mantissa based on the exponent and a first precision, adjusting the mantissa to have the second precision, calculating barycentric coordinates on the basis of the floating-point real number with the adjusted mantissa, and generating a vertex by applying the barycentric coordinates to a patch equation.

The tessellation method may include analyzing first error in the calculation of the barycentric coordinates, analyze second error in the generating of the vertex, and modify the vertex based on the first error and the second error.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
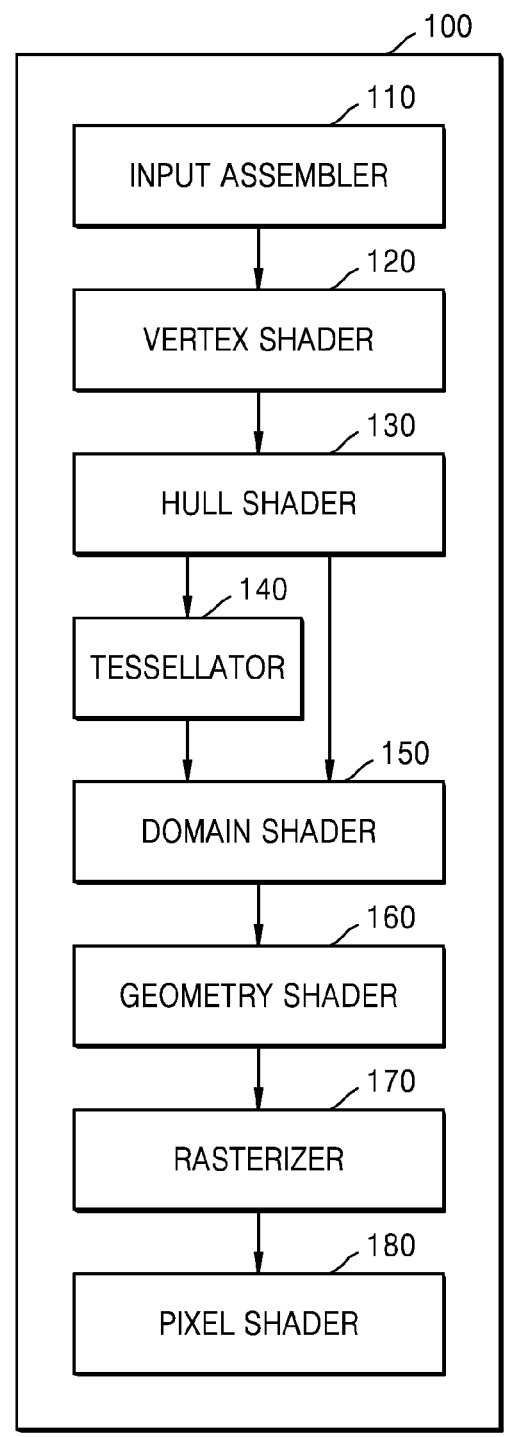
FIG. 1 is a diagram illustrating an example of a graphics processing apparatus.

FIG. 1 is a diagram illustrating an example of a three-dimensional (3D) graphics processing apparatus.

Referring to FIG. 1, a graphics processing system 100 may include an input assembler 110, a vertex shader 120, a hull shader 130, a tessellator 140, a domain shader 150, a geometry shader 160, a rasterizer 170, and a pixel shader 180.

The input assembler 110 may read vertices of primitives from a memory. For example, the primitive may be a polygon, such as, for example, a triangle. In the case of a graphics processing process including a tessellation operation, the primitive may be a patch. The patch may include one or more control points for defining a surface.

The vertex shader 120 may perform data processing on each control point. For example, the vertex shader 120 may adjust features such as, for example, texture coordinates, colors, and positions of control points.

The hull shader 130, the tessellator 140, and the domain shader 150 may be enabled when performing tessellation. The hull shader 130 may transmit control points, which are converted by the vertex shader 120, to the domain shader 150. When control points of patches represent a complex surface, the hull shader 130 may perform additional data processing on the control points before transmission to the domain shader 150.

Also, the hull shader 130 may determine a tessellation factor representing a level of tessellation. The tessellation factor is information indicating how minutely a polygon is divided on each patch.

The tessellator 140 subdivides input primitives (e.g., patches) of a 3D scene into a plurality of output primitives. The tessellator 140 may subdivide patches into smaller output primitives, for example, triangles, quads, or isolines according to the tessellation factor provided by the hull shader 130. An output of the tessellator 140 may be a set of vertices defining output primitives. The domain shader 150 may process the output primitives generated by the tessellator 140. The domain shader 150 may calculate a position of the output vertex.

By this process, the tessellation renders a smoother curved surface that may graphically represent minuter images.

The geometry shader 160 may execute a shader program to generate additional primitives from the tessellated output primitives. The rasterizer 170 may divide the output primitives into a plurality of fragments. The fragment is a constituent unit of the primitive and may be a basic unit for image processing.

The pixel shader 180 may shade a pixel or fragment. For example, the pixel shader 180 may designate a color of the pixel or fragment. Also, a depth test, clipping, culling, blending, or the like may be additionally performed on pixels or fragments. An output of the pixel shader 180 may be stored in a frame buffer, and a stored frame may be displayed by a display device.

Figure 2:
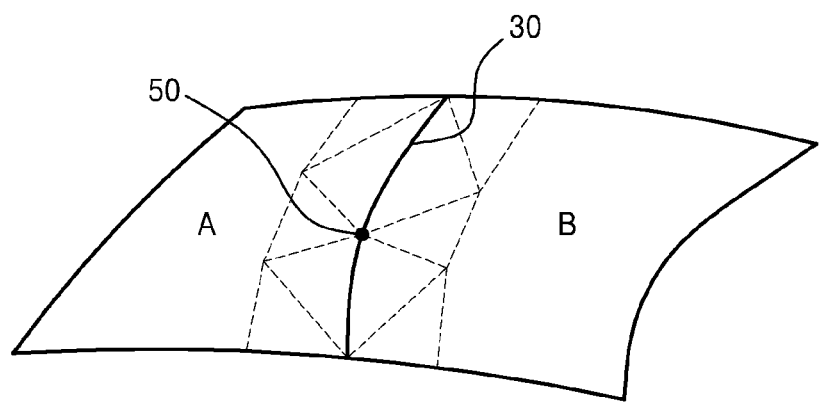
FIG. 2 is a diagram illustrating an example of a tessellation method.

FIG. 2 is a diagram illustrating an example of a tessellation method. Referring to FIG. 2, A and B denote two adjacent patches. Patch A and patch B share a boundary 30 with each other. The tessellator 140 may independently tessellate patch A and patch B. For example, the tessellator 140 may subdivide patch A into smaller primitives and subdivide patch B into smaller primitives. The tessellator 140 may calculate vertices in patch A on the basis of parameters of patch A and may calculate vertices in patch B on the basis of parameters of patch B.

When calculating the vertices using the parameters input as floating-point real numbers, an error occurs because floating-point real numbers cannot represent numbers exceeding a certain precision. The error affects the values of vertices calculated at the boundary 30 between patch A and patch B. Also, since different errors occur in patch A and patch B, a value of a vertex 50 in patch A may be different from a value of the vertex 50 in patch B. Accordingly, a crack may occur at the boundary 30 between patch A and patch B.

The tessellator 140 may adjust the precision of values (e.g., floating-number real numbers) calculated in the tessellation process, so that the values of the vertex 50 calculated at the boundary between the adjacent patches may not differ. Accordingly, a crack can be prevented from occurring at the boundary 30 between patch A and patch B.

Figure 3:
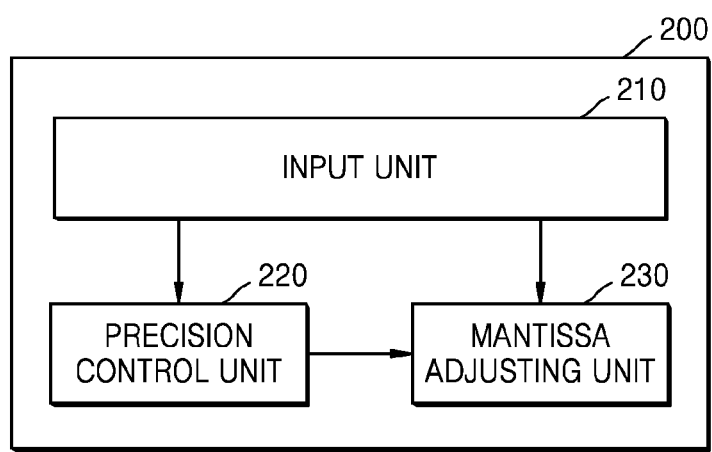
FIG. 3 is a diagram illustrating an example of a tessellation apparatus.

FIG. 3 is a diagram illustrating an example of a tessellation apparatus 200. The tessellation apparatus 200 of FIG. 3 may correspond to the tessellator 140 illustrated in FIG. 1. Referring to FIG. 3, the tessellation apparatus 200 may include an input unit 210, a precision control unit 220, and a mantissa adjusting unit 230.

The input unit 210 may receive an input of a floating-point real number represented in a floating-point mode. The floating-point real number may be represented by an exponent and a mantissa. Each of the exponent and the mantissa may be represented using a predetermined number of bits. For example, in a single-precision mode representing real numbers by 32 bits, a real number may be represented using a 1-bit sign, an 8-bit exponent, and a 23-bit mantissa; and in a double-precision mode representing real numbers by 64 bits, a real number may be represented using a 1-bit sign, an 11-bit exponent, and a 52-bit mantissa.

The input unit 210 may receive an input of parameter values needed in the tessellation process and values calculated in the tessellation process, as floating-point real numbers. The parameter may include a patch parameter (e.g., data of vertices of patches) and a patch equation. Also, the input unit 210 may receive an input of barycentric coordinate values calculated using the patch parameter and values of vertices calculated using the patch equation, as floating-point real numbers.

The precision control unit 220 may determine a precision (second precision) of a mantissa on the basis of a value of an exponent of an input floating-point real number and a preset floating-point precision (first precision). The precision may be a value indicating up to which-order decimal place a floating-point real number will be represented. For example, when the precision of a floating-point real number is 3, the floating-point real number may be represented up to the first decimal place. However, examples discussed here are only non-exhaustive illustrations, and other values of precision are considered to be well within the scope of the present disclosure.

The precision control unit 220 may determine the precision (second precision) of the mantissa by comparing the preset first precision with the value of the exponent of the input floating-point real number. For example, when the first precision is 3 and the value of the exponent of the input floating-point real number is −2, the mantissa may be restricted to have significant digits up to the first decimal place so that the floating-point real number may be represented up to the first decimal place. For example, the precision of the mantissa may be determined as 1.

When the precision of the mantissa is determined, the mantissa adjusting unit 230 may adjust the mantissa. For example, the mantissa adjusting unit 230 may round off, up or down a number of a place that is directly below a place determined according to the precision of the mantissa. For example, when the precision of the mantissa is 1 (i.e., when it is represented up to the first decimal place), the mantissa adjusting unit 230 may round off, up or down a number of the second decimal place that is directly below the first decimal place. Accordingly, the mantissa may be represented up to the first decimal place.

Accordingly, the value of the mantissa may be adjusted such that the exponent value and the sign value of the input floating-point real number may be similarly output and the floating-point real number may be represented with the preset first precision.

Figure 4:
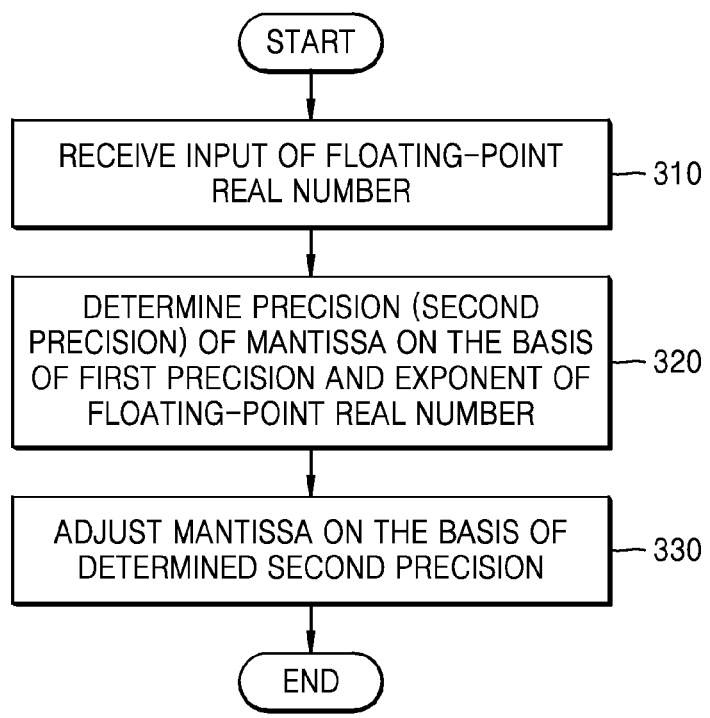
FIG. 4 is a diagram illustrating an example of a tessellation method.

FIG. 4 is a diagram illustrating an example of a tessellation method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. The above descriptions of FIGS. 1-3, is also applicable to FIG. 4, and is incorporated herein by reference. Thus, the above description may not be repeated here.

Referring to FIG. 4, in 310, the tessellation apparatus 200 may receive an input of a floating-point real number. For example, the tessellation apparatus 200 may receive an input of parameter values needed in the tessellation process and values calculated in the tessellation process, as floating-point real numbers. The parameter may include a patch parameter (e.g., data of vertices of patches) and a patch equation. Also, the tessellation apparatus 200 may receive an input of barycentric coordinate values calculated using the patch parameter and values of vertices calculated using the patch equation, as floating-point real numbers.

In 320, the tessellation apparatus 200 may determine a precision (second precision) of a mantissa on the basis of a value of an exponent of an input floating-point real number and a preset first precision.

For example, the tessellation apparatus 200 may determine the precision (second precision) of the mantissa according to the value of the exponent so that the floating-point real number may have the preset first precision. The above descriptions of the determination of the precision (second precision) of the mantissa with reference to FIG. 3, is also applicable to 320, and is incorporated herein by reference. Thus, the above description may not be repeated here.

In 330, the tessellation apparatus 200 may adjust the mantissa according to the determined precision (second precision) of the mantissa. For example, the tessellation apparatus 200 may round off, up or down a number of a place, which is directly below a place determined according to the second precision, so that the mantissa may be represented with the second precision.

Figure 5:
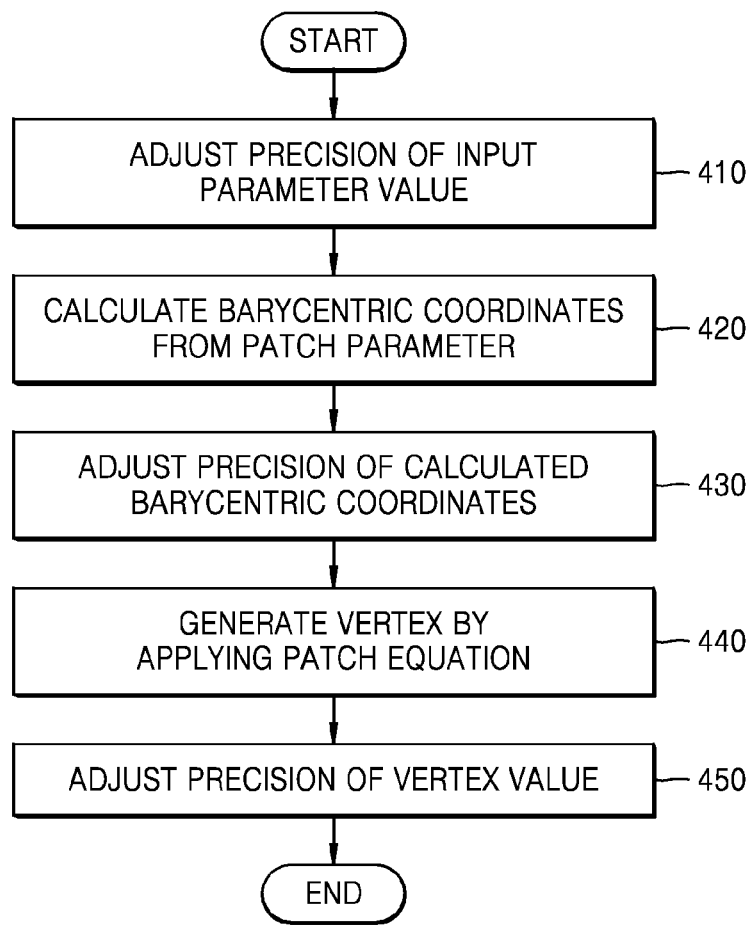
FIG. 5 is a diagram illustrating an example of a tessellation method.

FIG. 5 is a diagram illustrating an example of a tessellation method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. The above descriptions of FIGS. 1-4, is also applicable to FIG. 5, and is incorporated herein by reference. Thus, the above description may not be repeated here.

Referring to FIG. 5, in 410, the tessellation apparatus 200 may adjust the precision of an input parameter value. For example, the tessellation apparatus 200 may receive an input of a patch parameter (e.g., data of vertices of patches), and the patch parameter may be represented as a floating-point real number. The tessellation apparatus 200 may determine the precision of the patch parameter as a third precision.

When the precision of the patch parameter is determined as the third precision, the tessellation apparatus 200 may adjust the precision of the input patch parameter to the third precision. For example, when a value of an input vertex includes an exponent and a mantissa, the precision of the mantissa may be adjusted on the basis of a value of the exponent and a value of the third precision so that the value of the input vertex may be represented with the third precision.

Operation 310, operation 320, and operation 330 of FIG. 4 may be included in operation 410. The tessellation apparatus 200 may adjust the value of the input vertex with the third precision by performing the operations of FIG. 4 on the value of the vertex represented as a floating-point real number. The above descriptions of operation 310, operation 320, and operation 330 of FIG. 4, is also applicable to 410, and is incorporated herein by reference. Thus, the above description may not be repeated here.

For example, when the third precision is determined as 3, the mantissa may be adjusted so that the value of the input vertex may be represented up to the third decimal place. Accordingly, the value of the input vertex may be adjusted with the third precision by adjusting only the mantissa without adjusting the value of the exponent and the sign of the value of the input vertex.

In 420, the tessellation apparatus 200 may calculate barycentric coordinates using a patch parameter having the adjusted precision. In 430, the tessellation apparatus 200 may adjust the precision of the calculated barycentric coordinates. For example, the calculated barycentric coordinates may be represented as floating-point real numbers, and the tessellation apparatus 200 may adjust the precision of the calculated value.

When the precision of the barycentric coordinates is determined as 4, the tessellation apparatus 200 may adjust the precision of the barycentric coordinates to a fourth precision. For example, when a value of the barycentric coordinates includes an exponent and a mantissa, the precision of the mantissa may be adjusted on the basis of a value of the exponent and a value of the fourth precision so that the value of the barycentric coordinates may be represented with the fourth precision.

Operation 310, operation 320, and operation 330 of FIG. 4 may be included in operation 430 of FIG. 5, and the tessellation apparatus 200 may adjust the value of the barycentric coordinates with the fourth precision by performing the operations of FIG. 4 on the value of the barycentric coordinates represented as a floating-point real number. The above descriptions of operation 310, operation 320, and operation 330 of FIG. 4, is also applicable to 430, and is incorporated herein by reference. Thus, the above description may not be repeated here.

For example, when the fourth precision is determined as 5, the mantissa may be adjusted so that the value of the barycentric coordinates may be represented up to the fifth decimal place. Accordingly, the value of the barycentric coordinates may be adjusted with the fourth precision by adjusting only the mantissa without adjusting the exponent and the sign of the value of the barycentric coordinates.

In 440, the tessellation apparatus 200 may generate vertices by calculating a patch equation using the values (e.g., barycentric coordinates) adjusted with the fourth precision.

In 450, the tessellation apparatus 200 may adjust the precision of the generated vertex value. The vertex value may be represented as a floating-point value, and the tessellation apparatus 200 may determine the precision of the vertex value as a fifth precision. When the vertex value is represented by an exponent and a mantissa, the tessellation apparatus 200 may adjust the precision of the mantissa on the basis of a value of the exponent and a value of the fifth precision so that the vertex value may be represented with the fifth precision.

Operation 310, operation 320, and operation 330 of FIG. 4 may be included in operation 450 of FIG. 5, and the tessellation apparatus 200 may adjust the value of the input vertex with the fifth precision by performing the operations of FIG. 4 on the value of the vertex represented as a floating-point real number. The above descriptions of operation 310, operation 320, and operation 330 of FIG. 4, is also applicable to 450, and is incorporated herein by reference. Thus, the above description may not be repeated here.

For example, when the fifth precision is determined as 7, the mantissa may be adjusted so that the value of the input vertex may be represented up to the seventh decimal place. Accordingly, the vertex value may be adjusted with the fifth precision by adjusting only the mantissa without adjusting the exponent and the sign of the vertex value.

The tessellation apparatus 200 may output the vertex value adjusted with the fifth precision to a domain shader.

Figure 6:
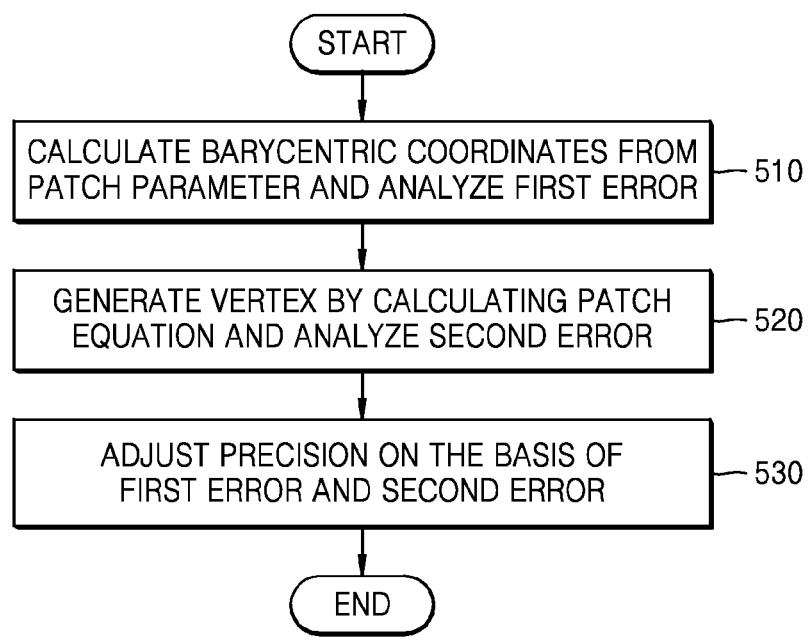
FIG. 6 is a diagram illustrating an example of a tessellation method.

FIG. 6 is a diagram illustrating an example of a tessellation method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. The above descriptions of FIGS. 1-5, is also applicable to FIG. 6, and is incorporated herein by reference. Thus, the above description may not be repeated here.

In 510, the tessellation apparatus 200 may calculate barycentric coordinates from a patch parameter and analyze a first error.

For example, the tessellation apparatus 200 may calculate barycentric coordinates of a patch parameter using an input patch parameter. The tessellation apparatus 200 may obtain first error data by analyzing the error (first error) generated in the process of the calculating the barycentric coordinates. For example, the first error data may include data indicating whether an exponent value changes and whether a carry occurs in the process of the calculating the barycentric coordinates.

In 520, the tessellation apparatus 200 may generate vertices by calculating a patch equation using the calculated barycentric coordinates, and analyze a second error.

For example, the tessellation apparatus 200 may obtain second error data by analyzing the error (second error) generated in the process of the calculating the patch equation. For example, the second error data may include data indicating whether an exponent value changes and whether a carry occurs in the process of the calculating the patch equation.

In 530, the tessellation apparatus 200 may adjust the precision of the generated vertex values on the basis of the first error and the second error.

For example, the tessellation apparatus 200 may perform error correction by applying the analyzed first error value and second error value to the generated vertex values. Also, the tessellation apparatus 200 may determine the precision of the generated vertex values on the basis of the first error value and the second error value. The tessellation apparatus 200 may adjust the mantissa in order to represent the generated vertex values with the determined precision.

Operation 310, operation 320, and operation 330 of FIG. 4 may be included in operation 530 of FIG. 6, and the tessellation apparatus 200 may adjust the value of the generated vertex with the determined precision by performing the operations of FIG. 4 on the value of the vertex represented as a floating-point real number. The above descriptions of operation 310, operation 320, and operation 330 of FIG. 4, is also applicable to 530, and is incorporated herein by reference. Thus, the above description may not be repeated here.

Figure 7:
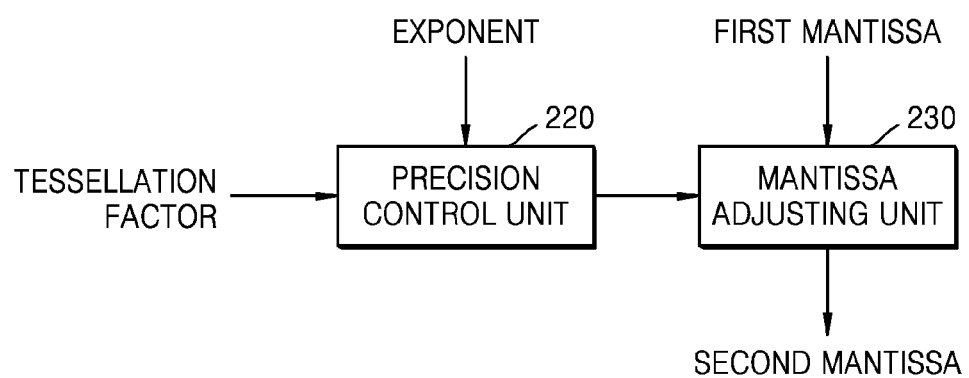
FIG. 7 is a diagram illustrating an example of a tessellation method.

FIG. 7 is a diagram illustrating an example of a tessellation method.

Referring to FIG. 7, the precision control unit 220 may receive an input of a tessellation factor in addition to a floating-point exponent value. The precision control unit 220 may adjust the precision of a floating point in consideration of the tessellation factor. The tessellation factor may include information indicating how minutely a patch is divided. For example, as a value of the tessellation factor increases, the patch may be divided into more primitives.

According to an example, when the value of the tessellation factor is greater than or equal to a preset value, the precision control unit 220 may determine the precision of the calculation values of the patch (e.g., barycentric coordinate values and vertex values) as a first value. When the value of the tessellation factor is smaller than the preset value, the precision control unit 220 may determine the precision of the calculation values of the patch as a second value smaller than the first value. The precision may increase as the value thereof increases.

The precision control unit 220 may determine the precision of the mantissa in consideration of the determined precision and the floating-point exponent value.

The mantissa adjusting unit 230 may adjust the mantissa such that the mantissa has the precision determined by the precision control unit 220. For example, the mantissa adjusting unit 230 may change the input first mantissa into a second mantissa by performing round-up, round-off, or round-down.

Accordingly, the tessellation apparatus 200 may obtain a new floating-point value that has a changed mantissa while having the same sign and exponent as the input floating-point value.

As described above, the tessellation methods may prevent the occurrence of a crack at the shared boundary between the adjacent patches by adjusting the precision of a floating point.

The apparatuses, units, modules, devices, and other components illustrated that perform the operations described herein are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-6 that perform the operations described herein with respect to FIGS. 4-6 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for performing a tessellation operation in a three-dimensional (3D) graphics processing by a graphics processing system comprising:
    obtaining, at a processor, input primitives of a three dimensional (3D) scene;
    generating, at the processor, output primitives by performing a tessellation operation on the input primitives; and
    generating image pixels based on the output primitives, the tessellation operation including,
        obtaining, at the processor, a first value that is calculated in performing tessellation, the first value being a first floating-point real number represented by a first exponent and a first mantissa,
        determining, at the processor, a second precision of the first mantissa based on a value of the first exponent and a first precision,
        adjusting, at the processor, the first mantissa to have the second precision,
        receiving, at the processor, a tessellation parameter as a second floating-point real number represented by a second exponent and a second mantissa,
        determining, at the processor, a fourth precision of the second mantissa based on a value of the second exponent and a third precision, and
        adjusting, at the processor, the second mantissa such to have the fourth precision,
        wherein the first value comprises a value calculated based on a second floating-point real number having the adjusted second mantissa.

2. The method of claim 1, wherein the adjusting of the first mantissa comprises rounding off a number of a decimal place such that the first mantissa has the second precision.

3. The method of claim 1, further comprising receiving a tessellation factor, and the first precision being determined based on the tessellation factor.

4. The method of claim 3, wherein
    a value of the first precision is determined as the first value in response to a value of the tessellation factor being greater than or equal to a preset value, and
    the value of the first precision is determined as a second value smaller than the first value in response to the value of the tessellation factor being smaller than the preset value.

5. The method of claim 4, wherein the first precision increases as the value thereof increases.

6. The method of claim 1, further comprising calculating barycentric coordinates based on of the second floating-point real number having the adjusted second mantissa, and
    wherein the first value comprises the barycentric coordinates.

7. The method of claim 6, further comprising generating a vertex by calculating a patch equation using the barycentric coordinates, and
    wherein the first value comprises a value of the generated vertex.

8. The method of claim 1, wherein the first precision is predetermined.

9. A non-transitory computer-readable recording medium that stores a program that performs the method of claim 1 when executed by a computer.

10. A graphics processing system for performing a tessellation operation in a three-dimensional (3D) graphics processing comprising:
    a memory storing computer-executable instructions; and
    one or more processors configured to execute the computer-executable instructions such that the one or more processors are configured to:
    obtain input primitives of a three dimensional (3D) scene;
    generate output primitives by performing a tessellation operation on the input primitives; and
    generate image pixels based on the output primitives,
    the performance of the tessellation operation including,
        receipt of a first value that is calculated in performing tessellation, the first value being a first floating-point real number represented by a first exponent and a first mantissa,
        determination of a second precision of the first mantissa based on a value of the first exponent and a first precision,
        adjustment of the first mantissa to have the second precision,
        receipt of a tessellation parameter as a second floating-point real number represented by a second exponent and a second mantissa,
        determination of a fourth precision of the second mantissa based on a value of the second exponent and a third precision, and
        adjustment of the second mantissa to have the fourth precision,
        wherein the first value comprises a value calculated based on a second floating-point real number having the adjusted second mantissa.

11. The graphics processing system of claim 10, wherein the one or more processors are configured to execute the computer-executable instructions such that the one or more processors are further configured to round off a number of a decimal place such that the first mantissa has the second precision.

12. The graphics processing system of claim 10, wherein the one or more processors are configured to execute the computer-executable instructions such that the one or more processors are further configured to determine the first precision based on a tessellation factor.

13. The graphics processing system of claim 12, wherein the one or more processors are configured to execute the computer-executable instructions such that the one or more processors are further configured to:
    determine a value of the first precision as the first value, in response to a value of the tessellation factor being greater than or equal to a preset value, and
    determine the value of the first precision as a second value smaller than the first value, in response to the value of the tessellation factor being smaller than the preset value.

14. The graphics processing system of claim 10, further comprising a calculator configured to calculate barycentric coordinates based on the second floating-point real number having the adjusted second mantissa, and wherein the first value comprises the barycentric coordinates.

15. The graphics processing system of claim 14, wherein:

the calculator is further configured to generate a vertex by calculating a patch equation using the barycentric coordinates, and the first value comprises a value of the generated vertex.

16. The graphics processing system of claim 10, wherein the first precision is predetermined.

* * * * *